US010312795B2

(12) United States Patent
Nishikawa et al.

(10) Patent No.: US 10,312,795 B2
(45) Date of Patent: Jun. 4, 2019

(54) INVERTER DEVICE CAPABLE OF SUPPRESSING OVERCURRENT WITHOUT INCREASING A LOAD AND OPERATION CONTROL METHOD

(71) Applicant: OMRON Corporation, Kyoto (JP)

(72) Inventors: Takeo Nishikawa, Kyoto (JP); Hironori Nakada, Nara (JP); Satoshi Iwai, Hirakata (JP); Hiroki Kawano, Kusatsu (JP); Yuhki Kamatani, Kyoto (JP); Kuniyuki Hirai, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/751,462

(22) PCT Filed: Jan. 11, 2017

(86) PCT No.: PCT/JP2017/000608
§ 371 (c)(1),
(2) Date: Feb. 8, 2018

(87) PCT Pub. No.: WO2017/154334
PCT Pub. Date: Sep. 14, 2017

(65) Prior Publication Data
US 2018/0248474 A1 Aug. 30, 2018

(30) Foreign Application Priority Data

Mar. 11, 2016 (JP) .................................. 2016-048218

(51) Int. Cl.
*H02M 1/32* (2007.01)
*H02M 7/5387* (2007.01)
(Continued)

(52) U.S. Cl.
CPC ............ *H02M 1/32* (2013.01); *H02M 7/5387* (2013.01); *H02M 7/53873* (2013.01); *H02J 3/18* (2013.01);
(Continued)

(58) Field of Classification Search
CPC ............. H02M 1/32; H02M 2001/325; H02M 7/5387; H02M 7/53873; H02M 7/537; H02M 2001/009; H02M 7/53871
See application file for complete search history.

(56) References Cited

U.S. PATENT DOCUMENTS 9,520,815 B2 *  12/2016  Sumi ........................ F04B 35/04
2010/0157634 A1 *   6/2010  Yu .............................. H02J 3/38
                                                                   363/98

(Continued)

FOREIGN PATENT DOCUMENTS

JP     H11-113251     4/1999
JP     2000-14163     1/2000
(Continued)

OTHER PUBLICATIONS

"International Search Report (Form PCT/ISA/210)" of PCT/JP2017/000608, dated Apr. 11, 2017, with English translation thereof, pp. 1-4.
(Continued)

*Primary Examiner* — Fred E Finch, III
*Assistant Examiner* — Rafael O. De León Domenech
(74) *Attorney, Agent, or Firm* — JCIPRNET

(57) ABSTRACT

An inverter has a plurality of switching elements, the states of which are each switched by a pulse signal supplied in accordance with a power grid voltage. The inverter is provided with: a switching circuit that converts an input DC voltage to an AC voltage and outputs the AC voltage to a pair of output lines; a filter circuit having output coils inserted in
(Continued)

the output lines; a current detection sensor that detects the current flowing through the output coils; and a high-speed pulse control circuit that, when an absolute value of the detected current is a threshold value or more, stops the supply of the pulse signal to the switching circuit.

19 Claims, 15 Drawing Sheets

(51) Int. Cl.
*H02M 7/537* (2006.01)
*H02M 1/00* (2006.01)
*H02J 3/18* (2006.01)
*H02M 1/12* (2006.01)

(52) U.S. Cl.
CPC ............ *H02M 1/126* (2013.01); *H02M 7/537* (2013.01); *H02M 7/53871* (2013.01); *H02M 2001/007* (2013.01); *H02M 2001/0009* (2013.01); *H02M 2001/325* (2013.01)

(56) References Cited

U.S. PATENT DOCUMENTS

| | | | |
|---|---|---|---|
| 2011/0310644 A1* | 12/2011 | Ogura | H02M 1/32 363/55 |
| 2017/0288403 A1* | 10/2017 | Lung | G05B 13/048 |

FOREIGN PATENT DOCUMENTS

| | | |
|---|---|---|
| JP | 2000-37081 | 2/2000 |
| JP | 2000-333473 | 11/2000 |
| JP | 2001-258264 | 9/2001 |
| JP | 2008-92709 | 4/2008 |
| JP | 2009-089541 | 4/2009 |
| JP | 2013-162699 | 8/2013 |

OTHER PUBLICATIONS

"Written Opinion of The International Searching Authority (Form PCT/ISA/237)" of PCT/JP2017/000608, dated Apr. 11, 2017, with English translation thereof, pp. 1-14.

* cited by examiner

※ REFER TO Typ VALUE

| Factors | Delay time (designed value) | Delay time (actual measurement) |
|---|---|---|
| Comparator | 1.3 | 0.98 |
| Monostable multivibrator +NOT+AND | 1.38 | 0.7 |
| TOTAL | 2.68 | 1.68 |

UNIT: usec

|  | Vac>0 | Vac<0 |
|---|---|---|
| UH | ON | OFF |
| UL | OFF | ON |
| WH | OFF | ON |
| WL | ON | OFF |
| US | OFF | ON |
| WS | ON | OFF |

| ITEM | TEST CONDITIONS |
|---|---|
| Inverter circuit | Heric |
| Operational state | Interconnection operation |
| Operation mode | Mppt mode |
| Input voltage | 250V |
| Output power | 5.9kW |
| Output coil | APPROXIMATELY 360 μH×2 |
| System voltage/frequency | AC202V / 50Hz |
| Sudden phase change input angle | 90° |
| Sudden phase change angle | 120° |

INVERTER DEVICE CAPABLE OF SUPPRESSING OVERCURRENT WITHOUT INCREASING A LOAD AND OPERATION CONTROL METHOD

CROSS-REFERENCE TO RELATED APPLICATION

This application is a 371 of international application of PCT application serial no. PCT/JP2017/000608, filed on Jan. 11, 2017, which claims the priority benefit of Japan application no. 2016-048218, filed on Mar. 11, 2016. The entirety of each of the abovementioned patent applications is hereby incorporated by reference herein and made a part of this specification.

TECHNICAL FIELD

The present invention relates to an inverter device which performs an interconnection output to a power system and particularly relates to an inverter device which is provided with countermeasures for protection from an overcurrent caused due to a sudden phase change or the like on the power system side.

BACKGROUND ART

FIG. 15 is a schematic view illustrating a configuration of a power conditioner 100 including an inverter 10 which performs an interconnection output to a power system P.

As illustrated in FIG. 15, the power conditioner 100 including the inverter (also referred to as a "system interconnection inverter") 10 is known, and the inverter 10 converts a high DC voltage, which is acquired by a DC/DC converter 20 boosting a low DC voltage output from a solar battery S or the like, into an AC voltage and performs an interconnection output to a commercial power system P (for example, refer to Patent Literature 1 or Patent Literature 2).

Incidentally, in the power system P, problems such as an instantaneous voltage rise, an instantaneous voltage drop, a sudden phase change, and an instantaneous power failure may occur.

FIG. 16 is a table showing conditions for a sudden phase change test. FIG. 17 is a schematic view illustrating a configuration of the inverter (Heric) 10 subjected to the sudden phase change test. FIG. 18 is a waveform chart showing an example of a result of the sudden phase change test.

As illustrated in FIG. 18, when a sudden phase change occurs in a system voltage Vac of the power system P, an overcurrent is generated from the power system P side toward the inverter 10. In this example, an output coil current I, which is normally maintained at approximately 40 A, reaches −350 A (since the current is an alternating current, the sign changes depending on the direction of the current). The inverter 10 has a configuration in which such a rapid change on the power system P side is absorbed by output coils L1 and L2 (serving as cushions) provided on the output side of the inverter 10 so that damage to the device is avoided.

A protective circuit, although it is not applied to the inverter described above, for protecting a PWM control device from an overcurrent without stopping an operation of the PWM control device when an overcurrent is generated in the PWM control device has been is proposed (for example, refer to Patent Literature 3).

CITATION LIST

Patent Literature

Patent Literature 1

Japanese Patent Application Laid-Open No. 2009-089541

Patent Literature 2

Japanese Patent Application Laid-Open No. 2008-092709

Patent Literature 3

Japanese Patent Application Laid-Open No. 11-113251

SUMMARY OF INVENTION

Technical Problem

An output coil used in an inverter is an expensive electrical component having a relatively large size and has a problem in that when the output coil is reduced in size due to restriction of an installation space, cost reduction, or the like, an overcurrent increases and damage to a device is likely to occur.

In addition, a detailed mechanism of an overcurrent generated due to a sudden phase change is still obscure, and no fundamental countermeasures have been taken.

In consideration of such problems in technologies in the related art, the present invention aims to provide an inverter device in which an overcurrent caused due to a sudden phase change of a power system is suppressed as much as possible even if an output coil is reduced in size.

Solution to Problem

In order to achieve the object, according to the present invention, there is provided an inverter device including a switching unit that has a plurality of switching elements of which states are individually switched in response to a pulse signal supplied in accordance with a system voltage, converts an input DC voltage into an AC voltage, and outputs the converted AC voltage to a plurality of output lines; a filter unit that has output coils inserted into the output lines; a current detecting unit that detects a current of the output coils; and a first control unit that stops supplying the pulse signal to the switching unit when an absolute value of a detection current detected by the current detecting unit is equal to or greater than a threshold value.

Here, the output lines for the switching unit outputting the converted voltage are not limited to a pair. For example, three output lines are provided when a three-phase alternating current is output. However, the output lines are not limited thereto. Examples of the current detecting unit include a current transformer and a shunt resistor but are not limited thereto.

According to the inverter device having such a configuration, an overcurrent can be suppressed without increasing a processing load on a side supplying the pulse signal to the switching unit in accordance with the system voltage. In addition, since determination is conducted based on a current actually flowing in the output coil, instead of the system voltage, an overcurrent can be suppressed more reliably. Since an output coil having an inductance value smaller than that in the related art can be used, it is possible to realize miniaturization and cost reduction of the inverter device.

In the inverter device of the present invention, the first control unit may be configured to have a monostable multivibrator which is in an unstable state when the absolute value of the detection current becomes equal to or greater than the threshold value and returns to a stable state after a certain time and to temporarily stop supplying the pulse signal to the switching unit while the monostable multivibrator is in an unstable state. The first control unit may be configured to be an analog circuit including a comparator and a logic gate.

According to the inverter device having such a configuration, since there is no need to provide any special processing or configurations for returning, due to using the monostable multivibrator, it is possible to realize necessary functions at low cost in a small size.

The inverter device of the present invention further includes a second control unit that supplies the pulse signal. The second control unit may be connected to the first control unit to be able to recognize that the first control unit has stopped supplying the pulse signal to the switching unit and may be connected to be able to monitor the system voltage. It is preferable that the certain time of the monostable multivibrator be longer than a sampling cycle of the second control unit. The second control unit may determine an initial state of the pulse signal based on the system voltage when the pulse signal restarts being supplied, and/or the second control unit may initialize an integral gain of proportional-integral control in a phase calculation using the system voltage.

Here, examples of the initial state of the pulse signal include the switching element to be operated next and a pulse signal width. It is preferable that the pulse signal width be gently increased and decreased. When the pulse signal width is $\Delta T$, an inductance of the output coils is L, an upper limit value for a current of the output coils is Imax, the DC voltage is Vdc, and the system voltage is Vac, it is preferable to set $\Delta T$ such that the following Expression is satisfied.

$$\Delta T < L \cdot Imax/(Vdc - Vac)$$

In addition, examples of the second control unit include a built-in microcomputer but are not limited thereto. The second control unit may control the pulse signal through pulse width modulation.

According to the inverter device having such a configuration, it is possible to avoid a phenomenon in which a current intermittently flows in the output coil, which is also preferable from a viewpoint of regulation of Fault Ride Through.

Advantageous Effects of Invention

According to the inverter device of the present invention, an overcurrent can be suppressed without increasing a processing load on a side supplying the pulse signal to the switching unit in accordance with the system voltage. In addition, since determination is conducted based on a current actually flowing in the output coil, instead of the system voltage, an overcurrent can be suppressed more reliably. Since an output coil having an inductance value smaller than that in the related art can be used, it is possible to realize miniaturization and cost reduction of the inverter device.

DESCRIPTION OF EMBODIMENTS

Hereinafter, a mechanism of generation of overcurrent elucidated by the applicant will be described before some embodiments of the present invention are described with reference to the drawings.

<Mechanism of Generation of Overcurrent>

Figure 1A:
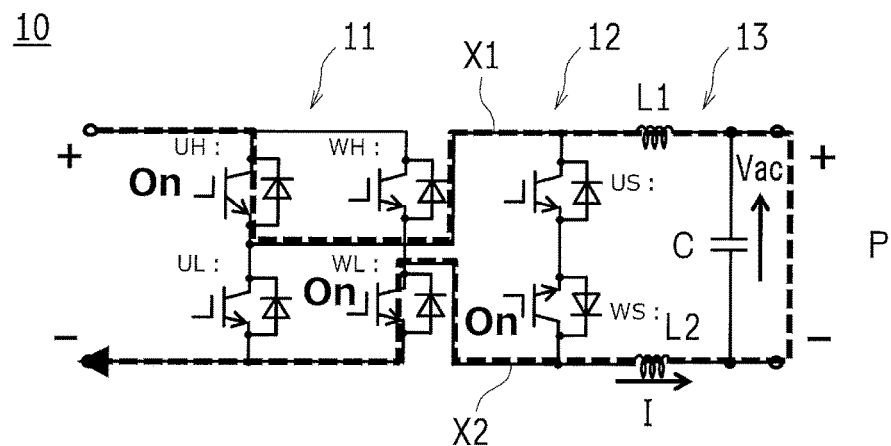
FIG. 1(A) is a view of an inverter 10 performing an interconnection output to a power system P, describing a state of each unit in the inverter 10 before a sudden phase change on the power system P side.
Figure 1B:
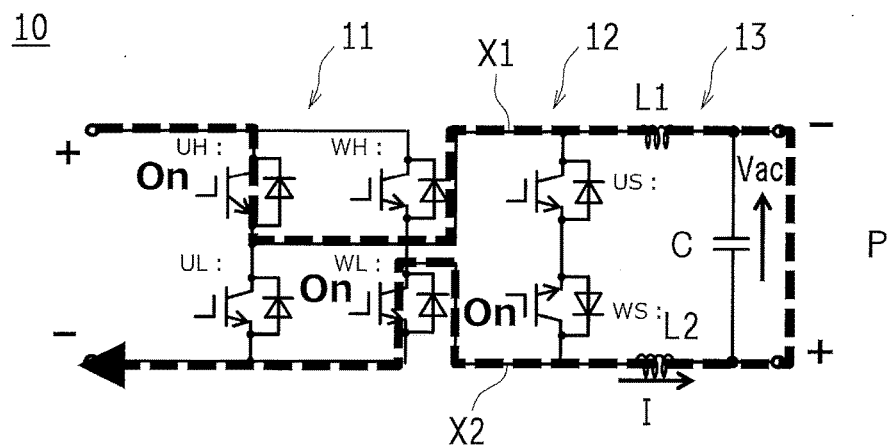
FIG. 1(B) is a view describing a state of each unit in the inverter 10 after a sudden phase change.
Figure 2:
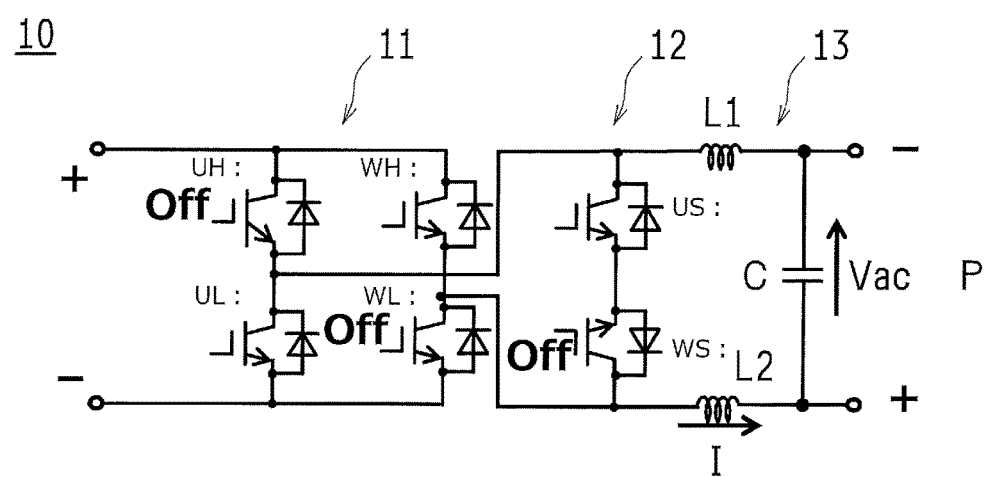
FIG. 2 is a view describing a state of each unit in the inverter 10 when appropriate countermeasures are taken after a sudden phase change.

FIG. 1(A) is a view of an inverter 10 performing an interconnection output to a power system P, describing a state of each unit in the inverter 10 before a sudden phase change on the power system P side. FIG. 1(B) is a view describing a state of each unit in the inverter 10 after a sudden phase change. FIG. 2 is a view describing a state of each unit in the inverter 10 when appropriate countermeasures are taken after a sudden phase change.

The inverter 10 includes a full bridge-type switching circuit 11 which has switching elements UH and UL connected in series and switching elements WH and WL connected in series, converts an input DC voltage into an AC voltage, and outputs the converted AC voltage to a pair of output lines X1 and X2; a short circuit 12 which has switching elements US and WS connected in series and is connected between the output lines X1 and X2; and a filter circuit 13 which has a capacitor C connected between the output lines X1 and X2 and output coils L1 and L2 respectively inserted into the output lines X1 and X2.

The switching circuit 11 chronologically switches the state of each of the switching elements UH, UL, WH, and WL at a predetermined point of time through pulse width modulation (PWM) control or the like performed by a microcomputer (not illustrated) or the like, and an AC voltage is generated between a connection point between the switching elements UH and UL and a connection point between the switching elements WH and WL. The switching circuit 11 is not limited to the full bridge type. For example, a half bridge-type switching circuit may be employed.

Similarly, the state of each of the switching elements US and WS in the short circuit 12 may also be controlled by a microcomputer (not illustrated) or the like.

Examples of the switching elements UH, UL, WH, WL, US, and WS include field effect transistors (FET), MOSFET, and IGBT but are not limited thereto.

For example, as illustrated in FIG. 1(A), when the switching elements UH, WL and WS are ON and the remaining switching elements UL, WH and US are OFF, even if a sudden phase change as illustrated in FIG. 1(B) occurs and a system voltage Vac is inverted, control of the inverter 10 is not always able to be immediately followed up.

Therefore, a current change $\Delta I = \Delta V \cdot \Delta t / L$ occurs due to a voltage difference $\Delta V - L \cdot \Delta I / \Delta t$ applied to the output coils L1 and L2. Here, L is an inductance value (L/2 for each coil) of the output coils L1 and L2, and $\Delta I$ is an amount of the current change between $\Delta t$s.

As can be seen from this calculation expression of $\Delta I$, when L is small, $\Delta I$ becomes significant, so that an overcurrent is generated and damage to the device may occur.

Therefore, as countermeasures against an overcurrent, it is assumed that when a sudden phase change occurs, generation of an overcurrent can be suppressed by quickly stopping PWM control to be in the state as illustrated in FIG. 2.

Here, in regard to a response time necessary for pulse control of PWM, for example, in order to have the current change $\Delta I$ to be 30 A or lower under conditions of $\Delta V=400$ V and $L=100$ μH, there is a need to perform control at $\Delta t<20$ μs.

However, for example, when the inverter 10 has a switching frequency of 20 kHz, its feedback cycle is 50 μs. Therefore, it is difficult to perform control within this range. If the feedback cycle is shortened, processing loads on the microcomputer and the like increase. Using a microcomputer capable of performing processing faster leads to a cost increase.

In addition, actually, since it is difficult to immediately detect occurrence of a sudden phase change in the power system P, it is assumed that an overcurrent is unlikely to be suppressed by simply performing the control in the related art.

First Embodiment 1.1 Schematic Configuration

Figure 3:
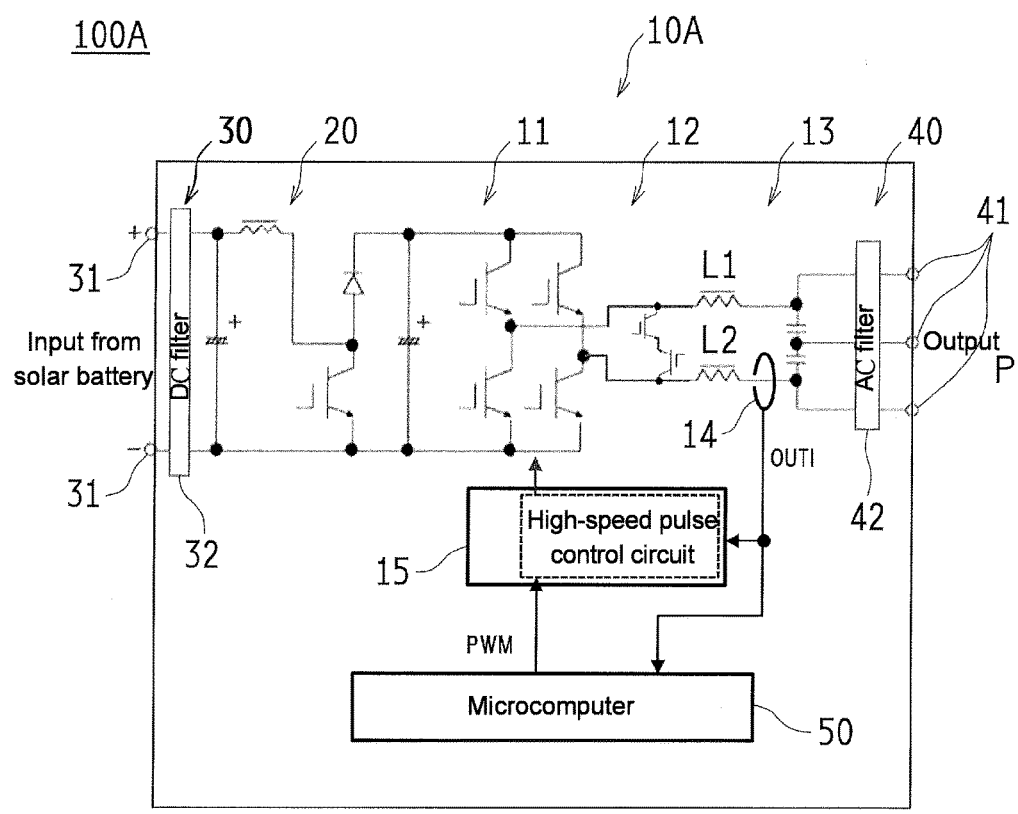
FIG. 3 is a schematic view illustrating a configuration of a power conditioner 100A including an inverter 10A according to a first embodiment of the present invention.

FIG. 3 is a schematic view illustrating a configuration of a power conditioner 100A including an inverter 10A according to a first embodiment of the present invention.

As illustrated in FIG. 3, the power conditioner 100A performing an interconnection output to the power system P has an input unit 30 which includes an input terminal 31 to which an output of a solar battery S or the like is connected, and a DC filter 32; a DC/DC converter 20 which boost a DC voltage input to the input unit 30; an inverter 10A which converts a DC voltage output from the DC/DC converter 20 into an AC voltage; an output unit 40 which includes an output terminal 41 for external connection and an AC filter 42 between the output terminal 41 and an output from the inverter 10A; and a microcomputer 50 controls an output of a PWM drive signal to the inverter 10A and the like.

Similar to the inverter 10 described above, the inverter 10A includes the switching circuit 11, the short circuit 12, and the filter circuit 13. Moreover, the inverter 10A includes a current detecting sensor 14 which detects an output coil current I, and a high-speed pulse control circuit 15 which performs control over stopping a PWM drive signal from the microcomputer 50 to the inverter 10A, returning, and the like based on a detection current OUT1 detected by the current detecting sensor 14.

Examples of the current detecting sensor 14 include a current transformer and a shunt resistor but are not limited thereto.

Examples of the microcomputer 50 include a built-in type but are not limited thereto.

The high-speed pulse control circuit 15 suppresses generation of an overcurrent by quickly stopping a PWM drive signal being supplied from the microcomputer 50 to the inverter 10A for a certain time, when the absolute value of the detection current OUT1 detected by the current detecting sensor 14 becomes a certain value (threshold value) or greater.

According to such an inverter 10A, since the high-speed pulse control circuit 15 is provided separately from the microcomputer 50 performing normal PWM control of the inverter 10A, it is possible to perform processing for suppressing an overcurrent without increasing the load on a CPU of the microcomputer 50. In addition, since determination is conducted based on a current actually flowing in the output coils L1 and L2, instead of the system voltage Vac, an overcurrent can be suppressed more reliably.

Accordingly, it is possible to reduce the inductance values of the output coils L1 and L2 which have been unlikely to be reduced in the related art, so that it is possible to realize miniaturization and cost reduction of the inverter 10A.

1.2 Specific Example of Configuration

Figure 4:
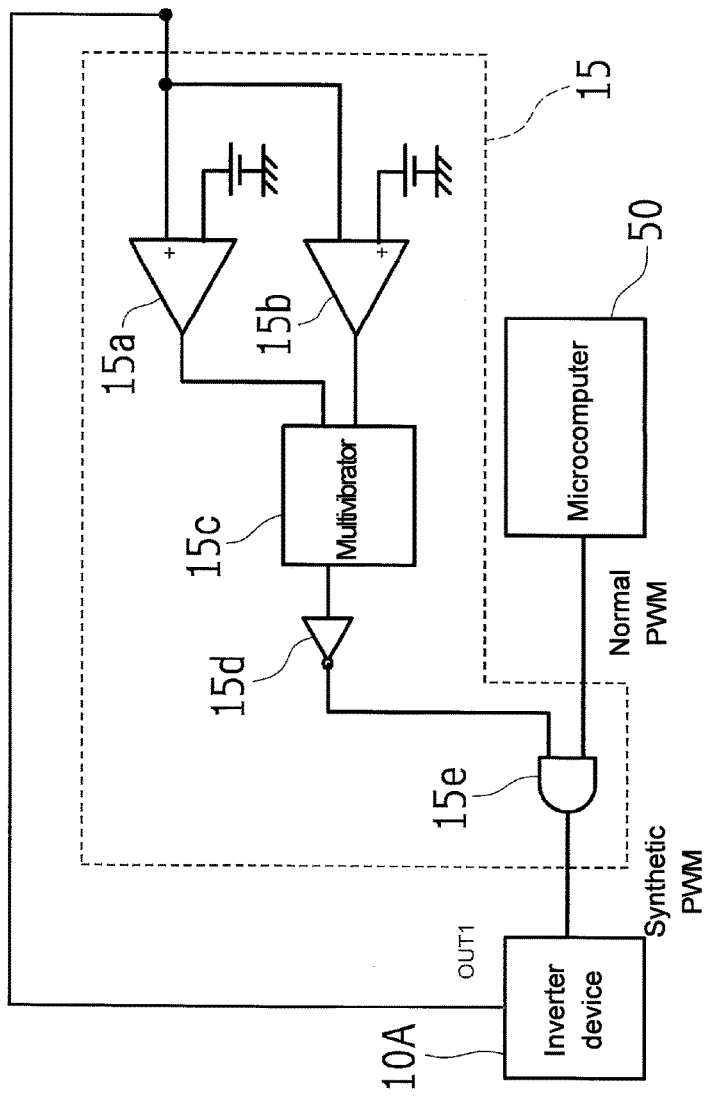
FIG. 4 is a schematic view illustrating an example of a specific configuration of a high-speed pulse control circuit 15 of the inverter 10A constituted as an analog circuit.

FIG. 4 is a schematic view illustrating an example of a specific configuration of the high-speed pulse control circuit 15 of the inverter 10A constituted as an analog circuit.

As illustrated in FIG. 4, the high-speed pulse control circuit 15 includes a comparator 15a which outputs "High" when the detection current OUT1 is input to a non-inversion input terminal, a predetermined reference voltage is input to an inversion input terminal, and a positive-side overcurrent is detected; a comparator 15b which outputs "Low" when the detection current OUT1 is input to the inversion input terminal, a predetermined reference voltage is input to the non-inversion input terminal, and a negative-side overcurrent is detected; a monostable multivibrator 15c to which outputs of the comparator 15a and the comparator 15b are connected and which normally outputs "Low"; an NOT gate 15d which inverts an output of the multivibrator 15c; and an AND gate 15e to which an output of the NOT gate 15d and a normal PWM drive signal from the microcomputer 50 are input.

In the high-speed pulse control circuit 15, the detection current OUT1 detected by the current detecting sensor 14 of the inverter 10A is input to each of the non-inversion input terminal of the comparator 15a and the inversion input terminal of the comparator 15b. When the detection current OUT1 is equal to or higher than the positive-side threshold value or is equal to the negative-side threshold value or lower, that is, when the absolute value of the detection current OUT1 becomes equal to or greater than the threshold value, "High" is output from the comparator 15a or "Low" is output from the comparator 15b. The output triggers the multivibrator 15c to operate, and "High" is output for only a certain time. Since the output is inverted at the NOT gate 15d, "Low" is output for a certain time on the input terminal side of the AND gate 15e. Meanwhile, regardless of the state of a PWM drive signal from the microcomputer 50, a synthetic PWM drive signal output from the AND gate 15e remains "Low".

Accordingly, when the absolute value of an overcurrent is equal to or greater than the threshold value, a PWM drive signal substantially stops being transmitted to the inverter 10A for a certain time from that time, and each of the switching elements in the inverter 10A can be in the state as illustrated in FIG. 2. Since the output returns to a normal output after a certain time, due to using a monostable multivibrator 15c, there is no need to provide any special processing or configurations for returning, so that it is possible to realize necessary functions at low cost in a small size.

The time during which the multivibrator 15c stops a PWM drive signal from the microcomputer 50 is set to be longer than a sampling cycle of the system voltage Vac by the microcomputer 50, so that it is possible to prevent sampling from missing without significantly increasing the load on the CPU of the microcomputer 50.

As a specific configuration of the high-speed pulse control circuit 15, the high-speed pulse control circuit 15 may be configured to be externally attached to an existing CPU substrate or the like, or may be integrated with the CPU substrate.

In addition, FPGA or the like may be used without being limited to establishment using the analog circuit as described above. In such a case, as its function, high-speed pulse control is included in addition to a normal microcomputer. However, the element may be integrated as a microcomputer in which FPGA is partially embedded. In addition, the microcomputer is an example of a computation processing element. For example, DSP or the like may be employed.

1.3 Evaluation Result

Figure 5:
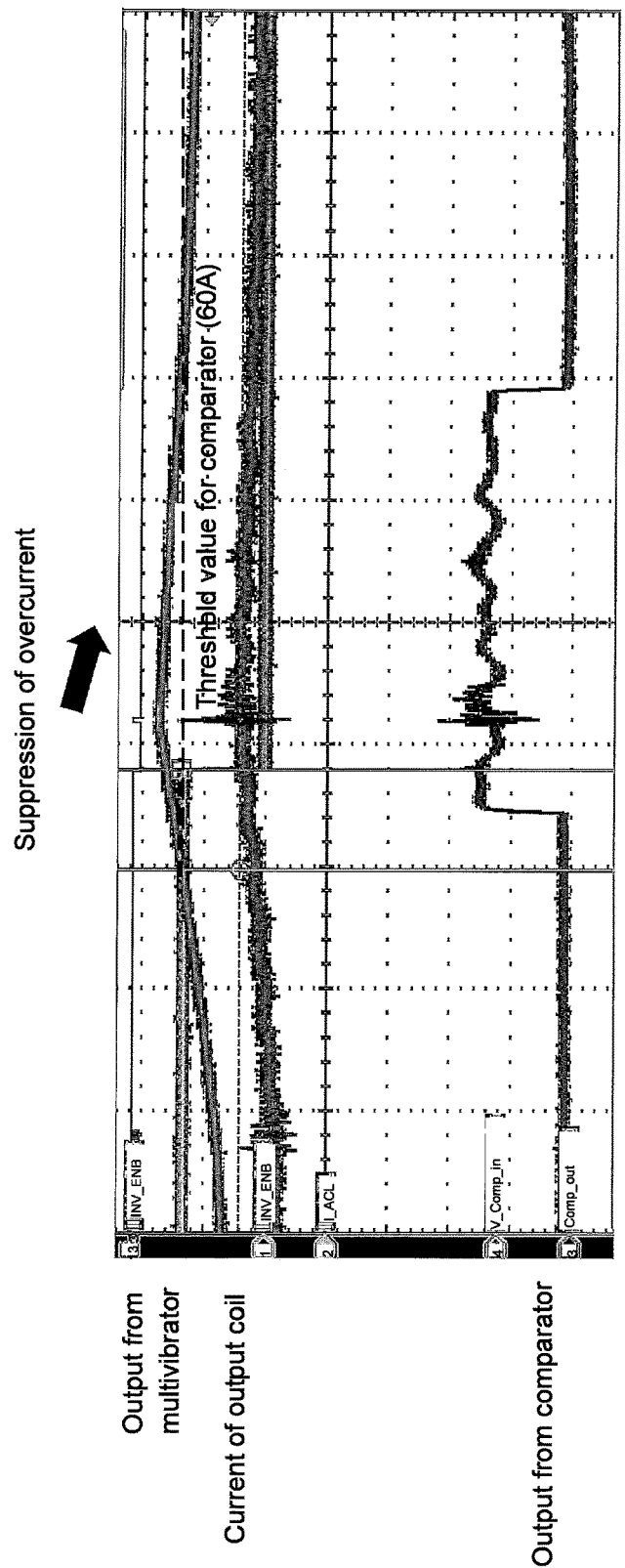
FIG. 5 is a waveform chart showing an example of a result of an operational check for the high-speed pulse control circuit 15 of the inverter 10A.
Figures 6, 7:
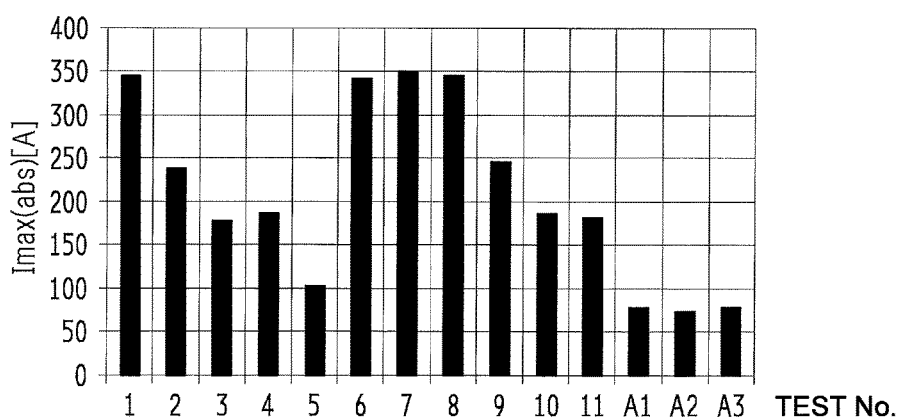
FIG. 6 is a table showing a designed value and an actual measurement value of a delay time.
FIG. 7 is a graph of a result of overcurrent suppression when the high-speed pulse control circuit 15 is added, checked for by increasing the number of samples.

FIG. 5 is a waveform chart showing an example of a result of an operational check for the high-speed pulse control circuit 15 of the inverter 10A. FIG. 6 is a table showing a designed value and an actual measurement value of a delay time.

As illustrated in FIG. 5, it is possible to check that when the output coil current I reaches the threshold value of the comparator 15a, an output of the comparator 15a becomes "High", and an output of the multivibrator 15c is then inverted at the NOT gate 15d and becomes "Low".

It is also possible to check that the output coil current I drops as a result thereof and generation of an overcurrent is being suppressed.

In addition, according to responsiveness checked at this time, as illustrated in FIG. 6, the responsiveness could be realized approximately at 1.7 µs, which was fast enough.

Figures 16, 17:
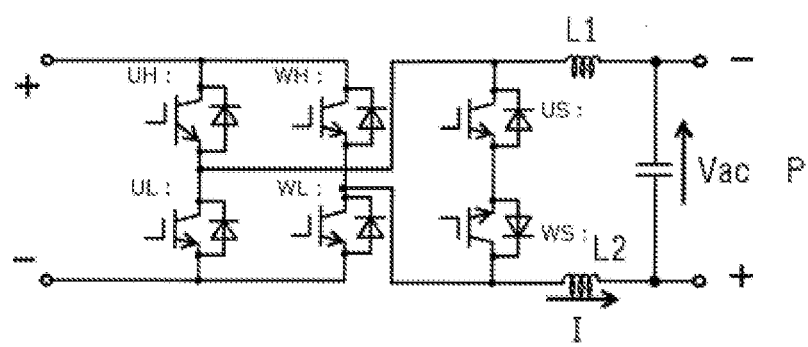
FIG. 16 is a table showing conditions for a sudden phase change test.
FIG. 17 is a schematic view illustrating a configuration of the inverter (Heric) 10 subjected to the sudden phase change test.
Figure 18:
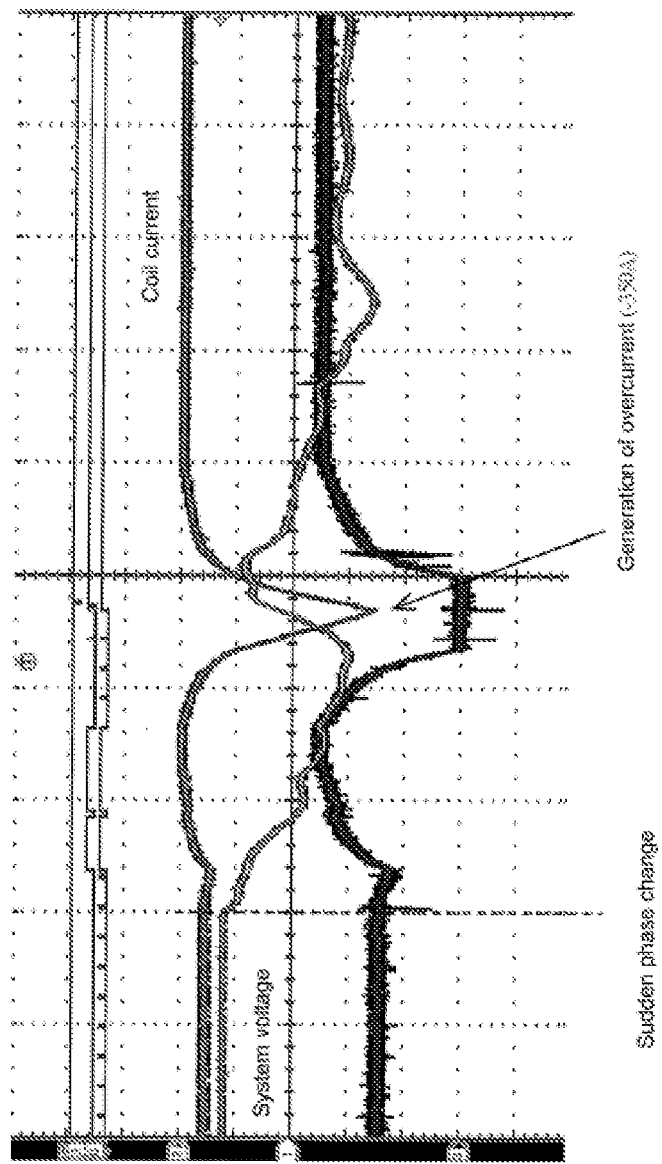
FIG. 18 is a waveform chart showing an example of a result of the sudden phase change test.

FIG. 7 is a graph of a result of overcurrent suppression when the high-speed pulse control circuit 15 is added, checked for by increasing the number of samples. Conditions for a sudden phase change test were the same as the conditions shown in FIG. 16.

As illustrated in FIG. 7, in the samples (test No. 1 to 11) by the inverter 10 (refer to FIG. 17) in the related art, an overcurrent of approximately 350 A at the maximum was generated as a result of a sudden phase change.

However, in the samples (test No. A1 to A3) by the inverter 10A in which the high-speed pulse control circuit 15 is added, it was checked that an overcurrent was suppressed to approximately 78 A (threshold value for the comparator 15a: 75 A) even at the maximum.

Second Embodiment 2.1 Remaining Problem of First Embodiment

Although an overcurrent can be suppressed when high-speed pulse control processing by the high-speed pulse control circuit 15 of the first embodiment described above is added, a PWM drive signal output from the microcomputer 50 is controlled forcibly and separately from the microcomputer 50. Therefore, erroneous PWM control continues during a period until the microcomputer 50 recognizes that the state of the power system P has changed, and the high-speed pulse control processing may operate again in succession (chattering) as a result.

Figure 8:
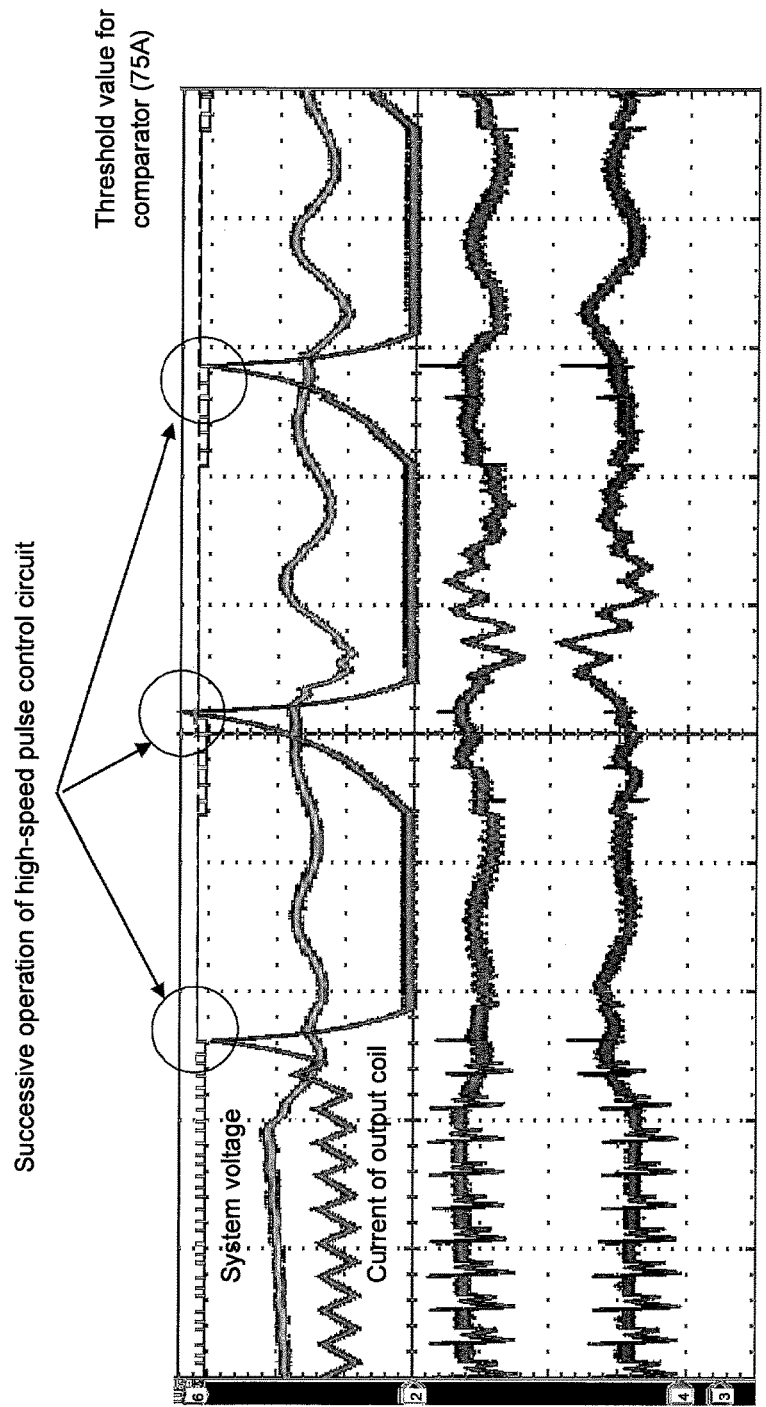
FIG. 8 is a waveform chart showing an example when the high-speed pulse control circuit 15 of the first embodiment operates high-speed pulse control processing in succession.
Figure 9:
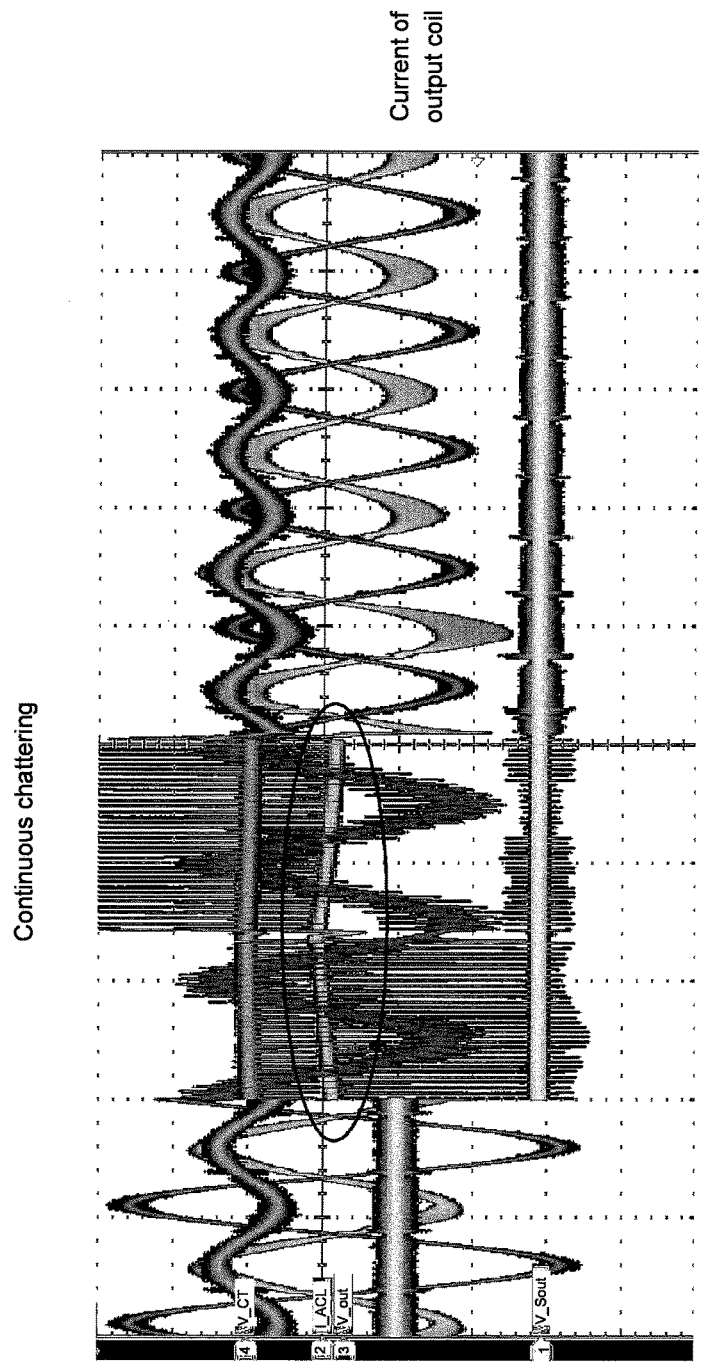
FIG. 9 is a waveform chart showing an example when the high-speed pulse control circuit 15 of the first embodiment continues high-speed pulse control processing over approximately two cycles of a system frequency.

FIG. 8 is a waveform chart showing an example when the high-speed pulse control circuit 15 of the first embodiment operates high-speed pulse control processing in succession. As the conditions at this time, the output power was 4.8 kW, the input phase was 45°, the rapid change phase was +41°, and the post-phase voltage was 104 Vrms. FIG. 9 is a waveform chart showing an example when the high-speed pulse control circuit 15 of the first embodiment continues high-speed pulse control processing over approximately two cycles of a system frequency.

As illustrated in FIG. 8, it was checked that the output coil current I became intermittent for a certain period. As illustrated in FIG. 9, depending on the conditions, an intermittent operation sometimes continues over approximately two cycles of the system frequency.

Incidentally, there exists regulation of Fault Ride Through (FRT) for a system interconnection inverter, such that the system has to be in continuous operation in case of a minor fluctuation. When the above-described phenomenon of intermittent outputs occurs in multiple power conditioners 100A at the same time, there is a possibility that the system voltage Vac will become unstable, which is not desirably.

2.2 Schematic Configuration

A second embodiment in which the above-described chattering is avoided and which has a function of immediately returning to appropriate control will be described below.

Figure 10:
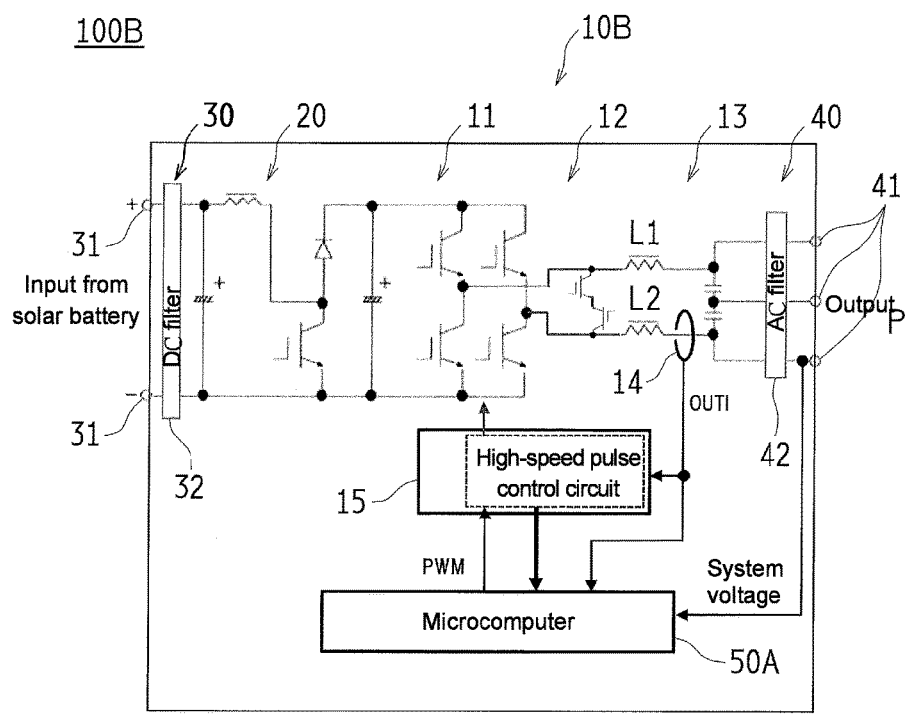
FIG. 10 is a schematic view illustrating a configuration of a power conditioner 100B including an inverter 10B according to a second embodiment of the present invention.

FIG. 10 is a schematic view illustrating a configuration of a power conditioner 100B including an inverter 10B according to the second embodiment of the present invention. The same reference signs will be applied to the same constituent members as those in the first embodiment, and the difference will be mainly described below.

As illustrated in FIG. 10, in the power conditioner 100B, in addition to the configuration of the power conditioner 100A of the first embodiment, a signal, which indicates that the multivibrator 15c is in operation in the high-speed pulse control circuit 15, is input to a microcomputer 50A, and the high-speed pulse control circuit 15 is connected such that the system voltage Vac can be monitored by the microcomputer 50A. The microcomputer 50A has the same hardware configuration as that of the microcomputer 50 of the first embodiment. However, the content of built-in control software is partially different.

When the multivibrator 15c operates in the high-speed pulse control circuit 15, the microcomputer 50A determines the initial state of PWM control, that is, the switching element to be operated next and a pulse width of PWM control based on information of the system voltage Vac obtained thereafter, and accelerates follow-up of the phase information on a phase locked loop (PLL). In addition, a pulse width of PWM control is gently increased and decreased (soft start).

Particularly in the inverter 10B, when there is an operation in which a PWM drive signal is controlled by the high-speed pulse control circuit 15, it is assumed that there is a rapid change on the power system P side. Therefore, smooth returning can be realized by newly requiring an appropriate operation of the microcomputer 50A based on the system voltage Vac obtained thereafter.

2.3 Switching Operation After Stop of PWM Drive Signal

Figures 11, 12:
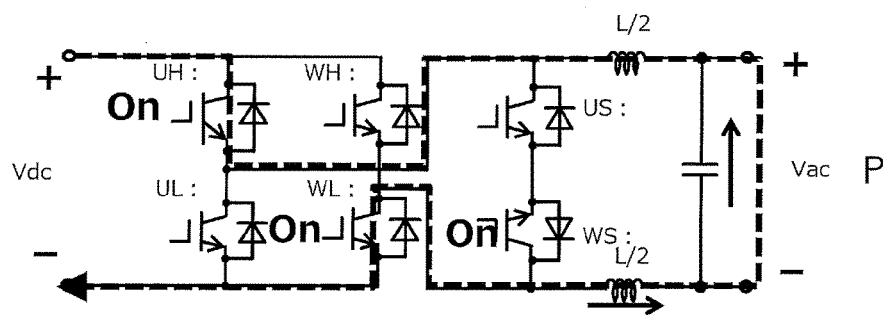
FIG. 11 is a view describing a state of each unit in the inverter 10 when appropriate countermeasures are taken after a sudden phase change.
FIG. 12 is a table showing an example of switching elements to be operated next after a PWM drive signal stops.

FIG. 11 is a view describing a state of each unit in the inverter 10 when appropriate countermeasures are taken after a sudden phase change. FIG. 12 is a table showing an example of switching elements to be operated next after a PWM drive signal stops.

For example, when a DC bus voltage (input-side voltage of the switching circuit 11) at a certain point of time is Vdc and a system voltage is Vac, a current $\Delta I$ flowing during a $\Delta T$ period is expressed as $Vdc-Vac=L\cdot\Delta I/\Delta T$.

Normally, the pulse width $\Delta T$ is appropriately adjusted such the current $\Delta I$ does not excessively flow. However, when the system voltage Vac rapidly changes, $\Delta I$ excessively flows unless $\Delta T$ is promptly changed.

However, generally, since the pulse width $\Delta T$ is designed to gently change through PI control (proportional-integral control), there is a possibility that follow-up for a rapid change in the system will be delayed and an overcurrent will be generated again at the time of returning.

Therefore, it is possible to prevent generation of an overcurrent in advance by providing restriction as follows and setting a pulse width, based on instantaneous voltage information acquired after a pulse stop.

$$\Delta T<L\cdot Imax/(Vdc-Vac)$$

At this time, it is desirable that Imax be a peak current value or the like at the time of a rated operation.

For example, it is assumed that a switching operation suitable for a system phase is performed by determining the switch to be operated, based on the positive/negative sign of the system voltage Vac acquired after a pulse stop, as in the table shown in FIG. 12.

2.4 PLL Follow-Up Acceleration after Stop of PWM Drive Signal

In the system interconnection inverter, the system voltage Vac is used in a phase calculation of the system by the PLL. Generally, in order to relax an influence such as noise, PI control is included in PLL, so that the phase gently changes even if the system voltage Vac rapidly changes.

However, on the contrary, when a sudden phase change occurs on the system side, there is a need to immediately follow the system phase, I-gain (integral gain) is tentatively reset (initialized) so that it is possible to promptly follow the appropriate phase after a pulse stop.

2.5 Evaluation Result

Figure 13:
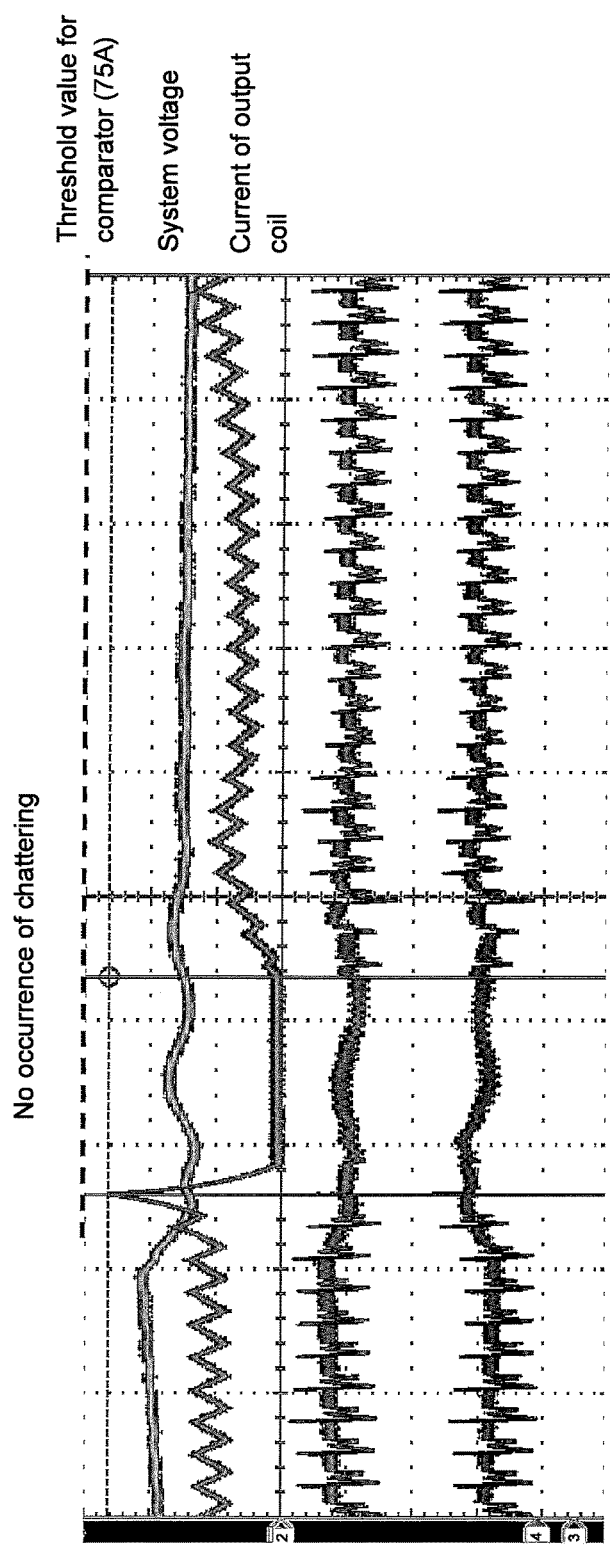
FIG. 13 is a waveform chart showing an example of a result of an operational check for the inverter 10B.

FIG. 13 is a waveform chart showing an example of a result of an operational check for the inverter 10B. Similarly, as the conditions at this time, the output power was 4.8 kW, the input phase was 45°, the rapid change phase was +41°, and the post-phase voltage was 104 Vrms.

As illustrated in FIG. 13, it was checked that a current gradually increased after a pulse stop was exercised, and the problem of an overcurrent flowing again and resulting in chattering was solved.

2.6 Processing Flow

Figure 14:
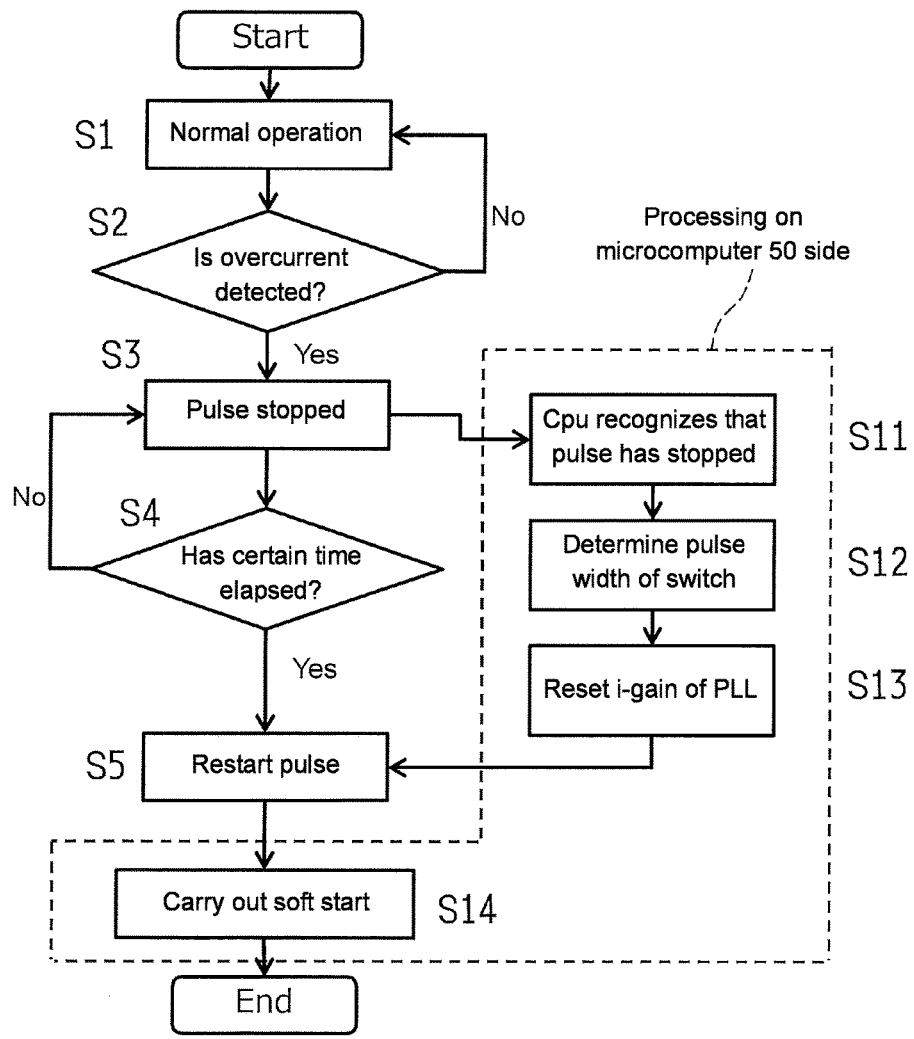
FIG. 14 is a flow chart showing schematic processing in the inverter 10B.
Figure 15:
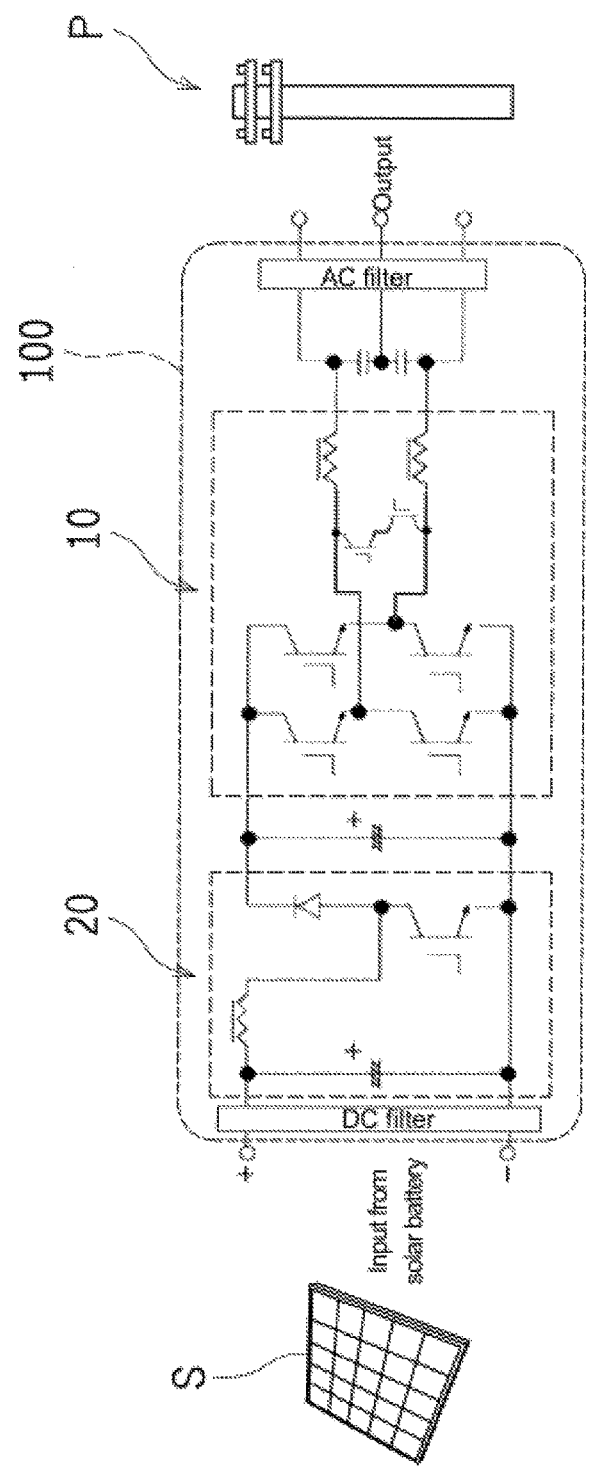
FIG. 15 is a schematic view illustrating a configuration of a power conditioner 100 including the inverter 10 which performs an interconnection output to the power system P.

FIG. 14 is a flow chart showing schematic processing in the inverter 10B. Steps S11 to S14 surrounded with the dotted line are steps of processing on the microcomputer 50 side, and the remaining Steps S1 to S5 are steps of processing on the high-speed pulse control circuit 15 side.

As illustrated in FIG. 14, when the high-speed pulse control circuit 15 is in a normal operation (Step S1), the detection current OUT1 detected by the current detecting sensor 14 is compared to the threshold value (Step S2), and when no overcurrent is detected, the processing returns to Step S1 and continues a normal operation.

When an overcurrent is detected (Yes in Step S2), a PWM drive signal is instantly stopped being supplied from the microcomputer 50 to the inverter 10A (Step S3).

Thereafter, after the lapse of certain time (Step S4), a PWM drive signal restarts being supplied from the microcomputer 50 to the inverter 10A (Step S5).

Meanwhile, when it is recognized in Step S3 on the microcomputer 50 side that a PWM drive signal has stopped being supplied (Step S11), the switch to be operated and the pulse width are determined based on the positive/negative sign of the system voltage Vac acquired thereafter (Step S12). Moreover, the I-gain (integral gain) of the PLL is reset (Step S13).

When a PWM drive signal restarts being supplied in Step S5, a soft start in which a pulse width is gently increased and decreased (Step S14) is performed.

The configurations of the embodiments, the modification examples thereof, and the like may be combined together unless there is any particular hindrance factors and the like.

The present invention can be executed in various forms without departing from its gist and main features. Therefore, the embodiments and examples described above are merely examples in all aspects and are not to be interpreted restrictively. The scope of the present invention is indicated by Claims and is not constrained by this specification at all. Moreover, all the changes and modifications which belong to a scope equivalent to Claims are included within the scope of the present invention.

The invention claimed is:

1. An inverter device comprising:
   a switching unit that has a plurality of switching elements of which states are individually switched in response to a pulse signal supplied in accordance with a system voltage, converts an input DC voltage into an AC voltage, and outputs the converted AC voltage to a plurality of output lines;
   a filter unit that has output coils inserted into the output lines;
   a current detecting unit that detects a current of the output coils;
   a first control unit that stops supplying the pulse signal to the switching unit when an absolute value of a detection current detected by the current detecting unit is equal to or greater than a threshold value; and
   a second control unit that supplies the pulse signal;
   wherein the first control unit is configured to have a monostable multivibrator;
   wherein a certain time of the monostable multivibrator is longer than a sampling cycle of the second control unit.

2. The inverter device according to claim 1, wherein the monostable multivibrator is in an unstable state when the absolute value of the detection current becomes equal to or greater than the threshold value and returns to a stable state after the certain time, and to temporarily stop supplying the pulse signal to the switching unit while the monostable multivibrator is in an unstable state.

3. The inverter device according to claim 2, wherein the first control unit is configured to be an analog circuit comprising a comparator and a logic gate.

4. The inverter device according to claim 1, wherein the second control unit is connected to the first control unit to be able to recognize that the first control unit has stopped supplying the pulse signal to the switching unit and is connected to be able to monitor the system voltage.

5. The inverter device according to claim 2, further comprising:

a second control unit that supplies the pulse signal, wherein the second control unit is connected to the first control unit to be able to recognize that the first control unit has stopped supplying the pulse signal to the switching unit and is connected to be able to monitor the system voltage.

6. The inverter device according to claim 1, wherein the second control unit determines an initial state of the pulse signal based on the system voltage when the pulse signal restarts being supplied.

7. The inverter device according to claim 6, wherein the initial state of the pulse signal indicates the switching element to be operated next and a pulse signal width.

8. The inverter device according to claim 7, wherein the second control unit gently increases and decreases the pulse signal width.

9. The inverter device according to claim 7, wherein when the pulse signal width is $\Delta T$, an inductance of the output coils is L, an upper limit value for a current of the output coils is Imax, the DC voltage is Vdc, and the system voltage is Vac, $\Delta T$ is set such that the following Expression is satisfied $\Delta T < L \cdot Imax/(Vdc-Vac)$.

10. The inverter device according to claim 1, wherein the second control unit initializes an integral gain of proportional-integral control in a phase calculation using the system voltage when the pulse signal restarts being supplied.

11. The inverter device according to claim 1, wherein the second control unit controls the pulse signal through pulse width modulation.

12. The inverter device according to claim 3, further comprising:

a second control unit that supplies the pulse signal, wherein the second control unit is connected to the first control unit to be able to recognize that the first control unit has stopped supplying the pulse signal to the switching unit and is connected to be able to monitor the system voltage.

13. The inverter device according to claim 5, wherein the second control unit determines an initial state of the pulse signal based on the system voltage when the pulse signal restarts being supplied.

14. The inverter device according to claim 1, wherein the second control unit determines an initial state of the pulse signal based on the system voltage when the pulse signal restarts being supplied.

15. The inverter device according to claim 8, wherein when the pulse signal width is $\Delta T$, an inductance of the output coils is L, an upper limit value for a current of the output coils is Imax, the DC voltage is Vdc, and the system voltage is Vac, $\Delta T$ is set such that the following Expression is satisfied $\Delta T < L \cdot Imax/(Vdc-Vac)$.

16. The inverter device according to claim 5, wherein the second control unit initializes an integral gain of proportional-integral control in a phase calculation using the system voltage when the pulse signal restarts being supplied.

17. The inverter device according to claim 1, wherein the second control unit initializes an integral gain of proportional-integral control in a phase calculation using the system voltage when the pulse signal restarts being supplied.

18. The inverter device according to claim 6, wherein the second control unit initializes an integral gain of proportional-integral control in a phase calculation using the system voltage when the pulse signal restarts being supplied.

19. The inverter device according to claim 5, wherein the second control unit controls the pulse signal through pulse width modulation.

* * * * *